US009569965B1

(12) United States Patent
Mitchell

(10) Patent No.: US 9,569,965 B1
(45) Date of Patent: Feb. 14, 2017

(54) SYSTEM AND METHOD FOR PROVIDING VEHICLE AND FLEET PROFILES

(75) Inventor: Peter Mitchell, Dublin (IE)

(73) Assignee: FLEETMATICS DEVELOPMENT LIMITED, Waltham, MA (US)

( * ) Notice: Subject to any disclaimer, the term of this patent is extended or adjusted under 35 U.S.C. 154(b) by 0 days.

(21) Appl. No.: 13/083,852

(22) Filed: Apr. 11, 2011

(51) Int. Cl.
G08G 1/123 (2006.01)
G01C 21/28 (2006.01)
G07C 5/00 (2006.01)
G01D 4/00 (2006.01)

(52) U.S. Cl.
CPC ............ G08G 1/123 (2013.01); G01C 21/28 (2013.01); G01D 4/004 (2013.01); G07C 5/008 (2013.01)

(58) Field of Classification Search
CPC .......... G08G 1/12; G07C 5/008; G01D 4/004; G06Q 10/047; G01C 21/28
USPC ....... 701/117; 705/2, 7.33, 4, 7.13; 707/201; 188/158; 180/167; 455/456.3; 370/242, 370/252; 342/357.31
See application file for complete search history.

(56) References Cited

U.S. PATENT DOCUMENTS

| 4,974,170 | A | 11/1990 | Bouve et al. |
| 5,652,707 | A * | 7/1997 | Wortham ............... G01D 4/004 340/990 |
| 5,682,525 | A | 10/1997 | Bouve et al. |
| 6,148,260 | A | 11/2000 | Musk et al. |
| 6,226,591 | B1 * | 5/2001 | Okumura ............... G01C 21/28 701/409 |
| 6,505,106 | B1 | 1/2003 | Lawrence et al. |
| 7,040,435 | B1 * | 5/2006 | Lesesky et al. .............. 180/167 |
| 7,388,518 | B2 | 6/2008 | Mitchell et al. |
| 8,140,358 | B1 * | 3/2012 | Ling et al. .................... 705/4 |
| 2004/0218910 | A1 | 11/2004 | Chang et al. |
| 2004/0254698 | A1 | 12/2004 | Hubbard et al. |
| 2005/0154769 | A1 * | 7/2005 | Eckart et al. ................. 707/201 |
| 2006/0116819 | A1 * | 6/2006 | Soundararajan ........ G01S 19/02 342/357.31 |
| 2006/0213731 | A1 * | 9/2006 | Lesesky et al. .............. 188/158 |
| 2007/0150188 | A1 | 6/2007 | Rosenberg |

(Continued)

FOREIGN PATENT DOCUMENTS

DE 10151354 5/2003
DE 10 2006 056 874 6/2008

(Continued)

OTHER PUBLICATIONS

U.S. Appl. No. 12/391,516, filed Feb. 24, 2009, Jiajun Zhu.

(Continued)

*Primary Examiner* — Yuri Kan
(74) *Attorney, Agent, or Firm* — Frommer Lawrence & Haug LLP

(57) ABSTRACT

Disclosed are a computer systems, methods and products including at least one computer processor and computer readable storage medium or media including computer code and at least one storage device in which is stored GPS data for a plurality of vehicles. One or more processors are programmed at least to receive GPS event data transmitted from a plurality of GPS devices, each GPS device associated a vehicle; for each vehicle, store in a memory operatively coupled to at least one of the processors, the GPS event data; analyze the GPS event data to derive a plurality of operational metrics for each vehicle; and provide, for a graphic user interface, an interactive display configured display a graphic presentation of at least one operational metric for each of a plurality of vehicles.

19 Claims, 8 Drawing Sheets

(56) References Cited

U.S. PATENT DOCUMENTS

| | | | |
|---|---|---|---|
| 2007/0239322 A1 | 10/2007 | McQuade et al. | |
| 2007/0266180 A1 | 11/2007 | Mitchell et al. | |
| 2008/0300784 A1 | 12/2008 | Kleinstern et al. | |
| 2009/0135730 A1* | 5/2009 | Scott et al. | 370/252 |
| 2009/0138188 A1* | 5/2009 | Kores et al. | 701/117 |
| 2010/0057334 A1 | 3/2010 | Ramaswamy et al. | |
| 2011/0071867 A1* | 3/2011 | Chen et al. | 705/7 |
| 2011/0093291 A1* | 4/2011 | Leistner | 705/2 |
| 2011/0112717 A1 | 5/2011 | Resner | |
| 2011/0122775 A1* | 5/2011 | Zampetti et al. | 370/242 |
| 2011/0153367 A1* | 6/2011 | Amigo et al. | 705/4 |
| 2011/0161102 A1* | 6/2011 | Leistner | 705/2 |
| 2011/0191135 A1* | 8/2011 | Williams | G06Q 10/047 705/7.13 |
| 2011/0307297 A1* | 12/2011 | Leistner | 705/7.33 |

FOREIGN PATENT DOCUMENTS

| | | |
|---|---|---|
| GB | 2337653 | 11/1999 |
| GB | 2 345 824 | 7/2000 |
| WO | WO 2008/065131 | 6/2008 |

OTHER PUBLICATIONS

International Preliminary Report on Patentability for PCT/EP2012/071304 dated May 15, 2014.
International Preliminary Report on Patentability for PCT/EP2012/071217 dated May 15, 2014.

* cited by examiner

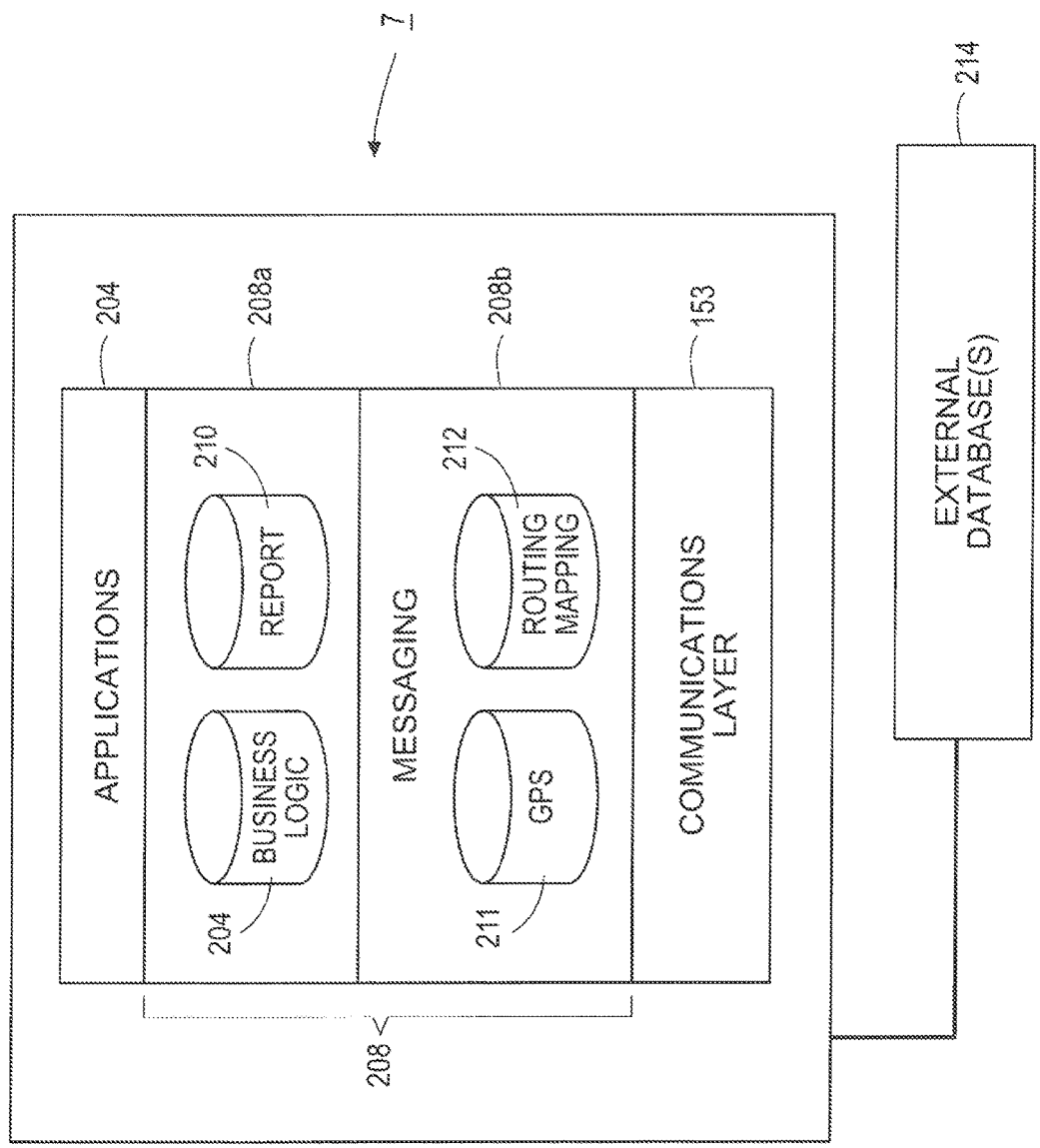

SYSTEM AND METHOD FOR PROVIDING VEHICLE AND FLEET PROFILES

DESCRIPTION OF RELATED ART

It is known to provide an on-board unit which uses technology such as GPS (Global Positioning System) to monitor a vehicle's positions and transmit wireless uploads to a central host system as well as manage of incoming data traffic without data losses or corruption and/or without database record locking. Such a unit may also upload vehicle status events such as engine fault events. GB2345824 and U.S. Pat. No. 7,388,518 describes such systems and methods therefor, the entirety of each of which are incorporated by reference herein.

SUMMARY

According to an embodiment, disclosed is a computer system including at least one computer processor and computer readable storage medium or media including computer code and at least one storage device in which is stored GPS data for a plurality of vehicles the system comprising: one or more processors programmed at least to receive GPS event data transmitted from a plurality of GPS devices, each GPS device associated with a vehicle; for each vehicle, store in a memory operatively coupled to at least one of the processors, the GPS event data; analyze the GPS event data to derive a plurality of operational metrics for each vehicle; and provide, for a graphic user interface, an interactive display configured display a graphic presentation of at least one operational metric for each of a plurality of vehicles.

In connection with an embodiment, disclosed is method comprising, in at least one computer and a computer readable storage medium or media including computer code: receiving GPS event data transmitted from a plurality of GPS devices, each GPS device associated with a vehicle; storing, for each vehicle, in a memory operatively coupled to at least one of the processors, the GPS event data; analyzing the GPS event data to derive a plurality of operational metrics for each vehicle; and providing, for a graphic user interface, an interactive display configured display a graphic presentation of at least one operational metric for each of a plurality of vehicles.

Additionally, in another embodiment, disclosed is a computer program product comprising a computer-readable storage medium encoded with instructions that, when executed by at least one processor within a computer system that comprises one or more processors and a memory operatively coupled to at least one of the processors, cause the computer system at least to: receive GPS event data transmitted from a plurality of GPS devices, each GPS device associated a vehicle; for each vehicle, store in a memory operatively coupled to at least one of the processors, the GPS event data; analyze the GPS event data to derive a plurality of operational metrics for each vehicle; and provide, for a graphic user interface, an interactive display configured display a graphic presentation of at least one operational metric for each of a plurality of vehicles.

BRIEF DESCRIPTION OF THE DRAWINGS

Embodiments are illustrated in the figures of the accompanying drawings, which are meant to be exemplary and not limiting, and in which like references are intended to refer to like or corresponding things.

FIGS. 1A-1C are block diagrams of a representative computer system.

DETAILED DESCRIPTION OF THE EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The use of the terms "a," "an," "at least one," "one or more," and similar terms indicate one of a feature or element as well as more than one of a feature. The use of the temi "the" to refer to the feature does not imply only one of the feature and element.

When an ordinal number (such as "first," "second," "third," and so on) is used as an adjective before a term, that ordinal number is used (unless expressly or clearly specified otherwise) merely to indicate a particular feature, such as to distinguish that particular feature from another feature that is described by the same term or by a similar term.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

The present invention will now be described in detail on the basis of exemplary embodiments. The invention disclosed herein may be practiced using programmable digital computers and networks therefor.

Figure 1A:
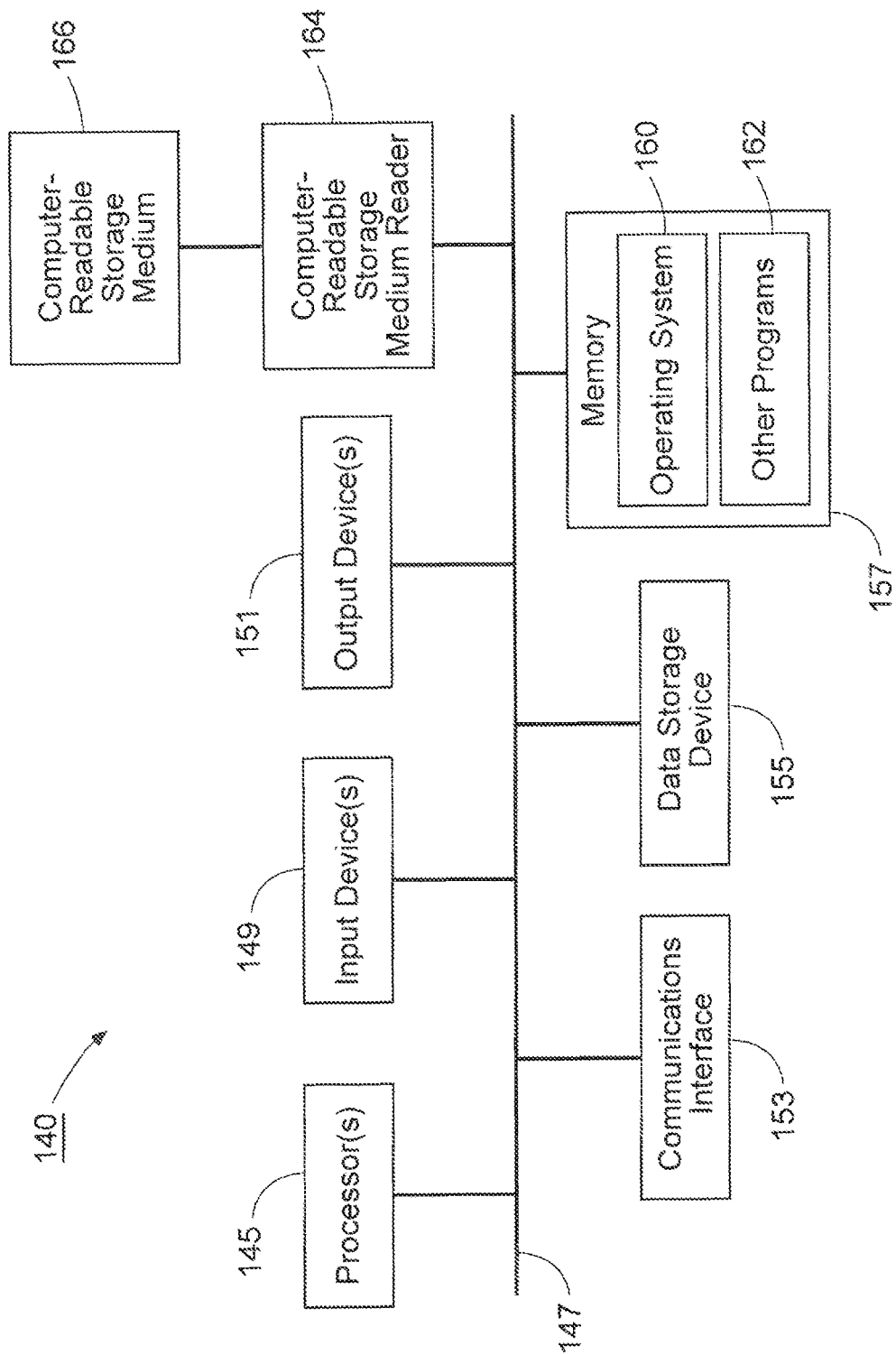
Figure 1B:
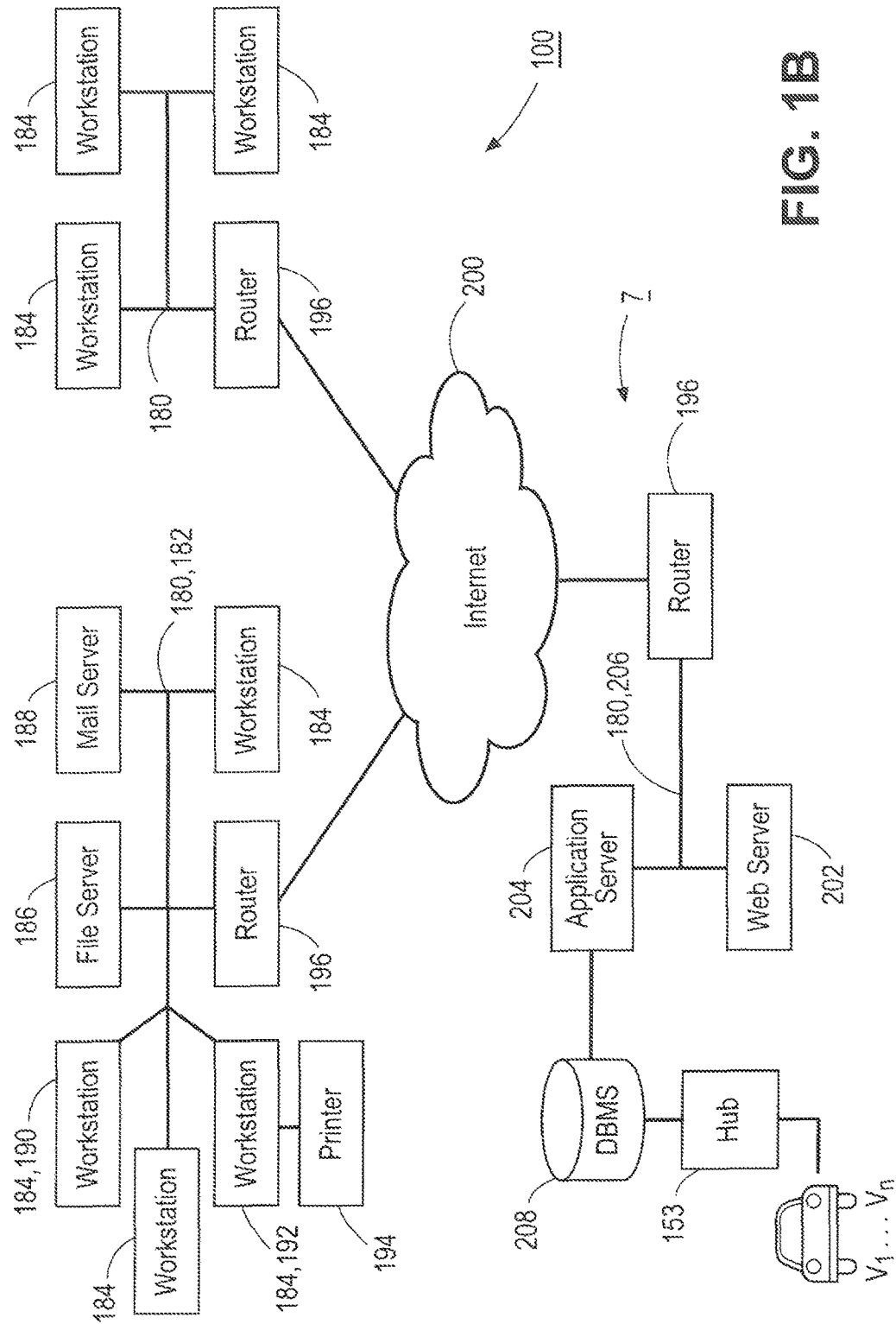

As shown in FIGS. 1A-1B, disclosed is a system 100, which includes a computer 140 containing a processor 145, memory 157 and other components typically present in general purpose computers.

FIG. 1A is a block diagram of a representative computer. The computer system 140 includes at least one processor 145, such as an Intel Core™ or Xeon™ series microprocessor or a Freescale™ PowerPC™ microprocessor, coupled to a communications channel 147. The computer system 140 further includes an input device 149 such as, e.g., a keyboard or mouse, an output device 151 such as, e.g., a CRT or LCD display, a communications interface 153, a data storage device 155 such as a magnetic disk or an optical disk, and memory 157 such as Random-Access Memory (RAM), each coupled to the communications channel 147. The communications interface 153 may be coupled to a network such as the Internet.

Memory 157 stores information accessible by processor 145, including instructions that may be executed by the processor 145. It also includes data that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 145 may be any well-known processor, such as processors from Intel Corporation or AMD. Alternatively, the processor may be a dedicated controller such as an ASIC.

The instructions may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

One skilled in the art will recognize that, although the data storage device 155 and memory 157 are depicted as different units, the data storage device 155 and memory 157 can be parts of the same unit or units, and that the functions of one can be shared in whole or in part by the other, e.g., as RAM disks, virtual memory, etc. It will also be appreciated that any particular computer may have multiple components of a given type, e.g., processors 145, input devices 149, communications interfaces 153, etc.

The data storage device 155 and/or memory 157 may store an operating system 160 such as Microsoft Windows 7®, Windows XP® or Vista™, Linux®, Mac OS®, or Unix®. Other programs 162 may be stored instead of or in addition to the operating system. It will be appreciated that a computer system may also be implemented on platforms and operating systems other than those mentioned. Any operating system 160 or other program 162, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified by processor 145 in accordance with the instructions. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

One skilled in the art will recognize that the computer system 140 may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 164, such as, e.g., a magnetic disk drive, magneto-optical drive, optical disk drive, or flash drive, may be coupled to the communications bus 147 for reading from a computer-readable storage medium (CRSM) 166 such as, e.g., a magnetic disk, a magneto-optical disk, an optical disk, or flash RAM. Accordingly, the computer system 140 may receive programs and/or data via the CRSM reader 164. Further, it will be appreciated that the term "memory" herein is intended to include various types of suitable data storage media, whether permanent or temporary, including among other things the data storage device 155, the memory 157, and the CSRM 166.

Two or more computer systems 140 may be connected, e.g., in one or more networks, via, e.g., their respective communications interfaces 155 and/or network interfaces (not depicted).

A computer system network is shown in FIG. 1B. A network 182 may, for example, connect one or more workstations 184 with each other and with other computer systems, such as file servers 186 or mail servers 188. The connection may be achieved tangibly, e.g., via Ethernet® or optical cables, or wirelessly, e.g., through use of modulated microwave signals according to the IEEE 802.11 family of standards. A computer system that participates in the network may send data to another computer system in the network via the network connection.

One use of a network 180 is to enable a computer system to provide services to other computer systems, consume services provided by other computer systems, or both. For example, a file server 186 may provide common storage of files for one or more of the workstations 190 on a network 182. A workstation 190 sends data including a request for a file to the file server 186 via the network 182 and the file server 186 may respond by sending the data from the file back to the requesting workstation 190.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

In one aspect, computer 204 is a server communicating with one or more client computers 184,192. For example, computer 204 may be a web server or a hub and data storage service. Each client computer may be configured similarly to the server 184, 192, with a processor, memory and instructions 240. Each client computer 184, 192 may be a personal computer, intended for use by a person, having all the internal components normally found in a personal computer such as a central processing unit (CPU), display device 151 (for example, a monitor having a screen, a projector, a touch-screen, a small LCD screen, a television, or another device such as an electrical device that is operable to display information processed by the processor), CD-ROM, harddrive, user input 149 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client computers 184, 192 may comprise a full-sized personal computer, the system and method may also be used in connection with mobile devices capable of wirelessly exchanging data with a server over a network such as the Internet. For example, client computer 1184,192 may be a wireless-enabled PDA such as a Blackberry phone or an Internet-capable cellular phone. In either regard, the user may input information using a small keyboard (in the case of a Blackberry phone), a keypad (in the case of a typical cell phone), a touch screen (in the case of a PDA) or any other means of user input.

Client computers 184, 192 may include a component, such as circuits, to determine the geographic location of the device. For example, mobile device may include a GPS receiver. By way of further example, the component may include software for determining the position of the device based on other signals received at the mobile device, such as signals received at a cell phone's antenna from one or more cell phone towers if the mobile device is a cell phone.

Servers 186, 188, 202, 204 and client computers 184 and 192 are capable of direct and indirect communication, such as over a network 180, 200. Although only a few computers are depicted in FIGS. 1A-1B, it should be appreciated that a typical system can include a large number of connected computers, with each different computer being at a different node of the network 200. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

A network 182 may be connected to one or more other networks 180, e.g., via a router 196. A router 196 may also act as a firewall, monitoring and/or restricting the flow of data to and/or from a network 180 as configured to protect the network. A firewall may alternatively be a separate device (not pictured) from the router 196

A network of networks 180 may be referred to as an internet. The term "the Internet" 200 refers to the worldwide network of interconnected, packet-switched data networks that uses the Internet Protocol (IP) to route and transfer data. A client and server on different networks may communicate via the Internet 200. For example, a workstation 190 may request a World Wide Web document from a Web Server 202. The Web Server 202 may process the request and pass it to, e.g., an Application Server 204. The Application Server 204 may then conduct further processing, which may include, for example, sending data to and/or receiving data from one or more other data sources. Such a data source may include, e.g., other servers on the same network.

For example in one embodiment, an on-board GPS unit uploads information (eg. via a hub 153) about a vehicle v1, v2 . . . vn to a central host system 208. Information about the vehicle derived from the GPS information can be presented to a user on a display device 151, for example, as a layout shown in FIG. 2.

Figure 2:
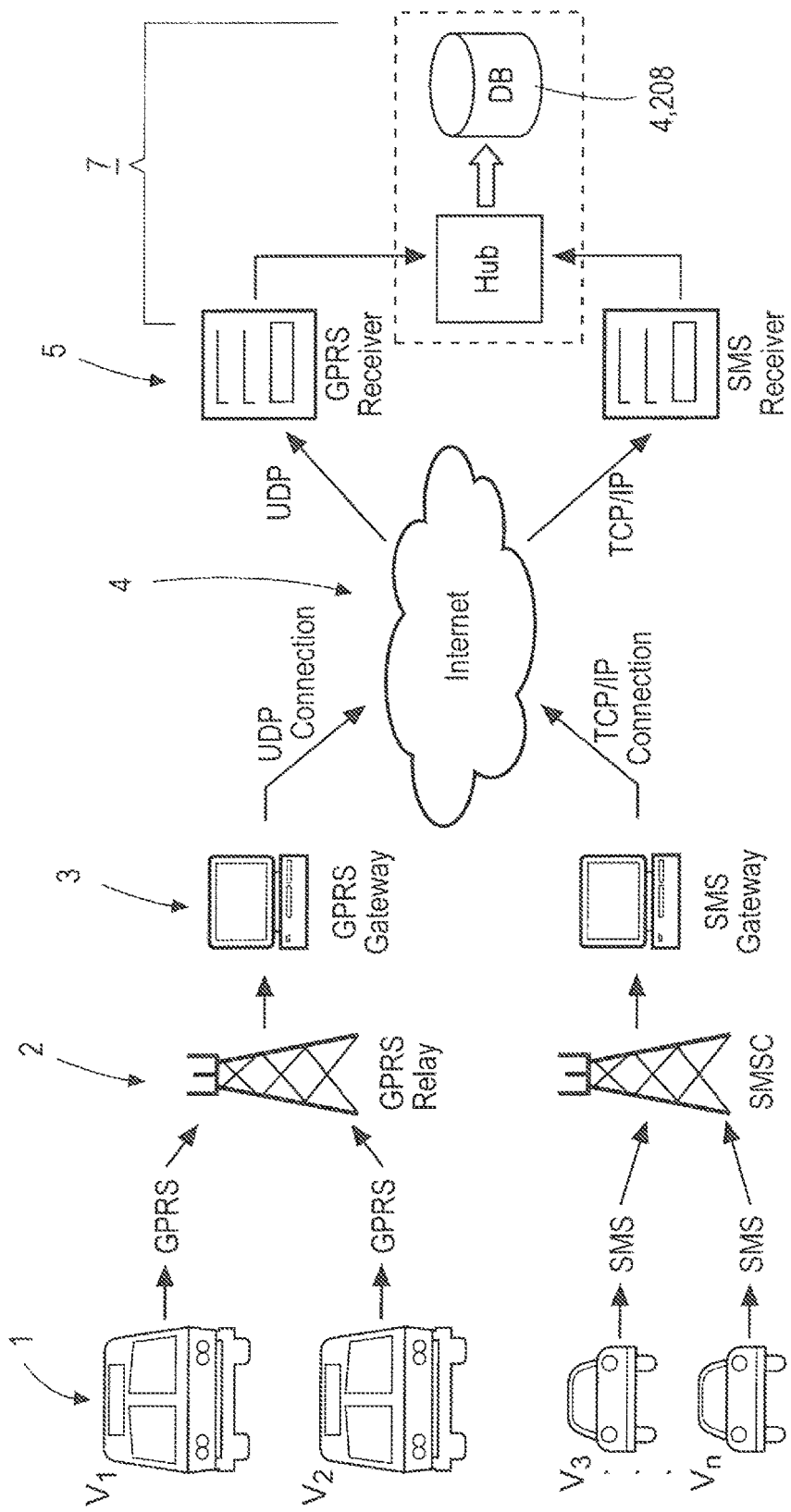
FIG. 2 depicts a representative GPS system.

In one embodiment, the system is programmed at least to receive GPS even data recorded by a GPS (Global Positioning System) device, for example, using an on-board unit which uses technology such as GPS to monitor a vehicle's positions and transmit wireless uploads to a central host system. Referring to FIG. 2 a vehicle tracking system comprises on-board units 1 in vehicles v1, v2, v3 . . . vn, which communicate wirelessly via mobile networks 2 to gateways 3. In this diagram two wireless protocols are indicated, namely GPRS and SMS. However there are typically a variety of additional protocols. The gateways 3 communicate using protocols such as UDP and TCP via the Internet 4 with a host system 7 having receivers 5 which are operating system services, and a data storage system 6. The incoming data is written from the receivers 5 to the data storage system 6, which includes a communication hub 153 and database 208. GB2345824 and U.S. Pat. No. 7,388,518 describes such systems and methods therefor, the entirety of each of which are incorporated by reference herein.

FIG. 1C is a block diagram of a host system 7 showing an exemplary system configuration for a host system 7. As shown therein, a communications layer 153 is operable to receive incoming GPS data and write data from the receivers 5 to the data storage system 208. The data storage system can be divided into any number of databases and logical layers for data analysis and storage. For example, a messaging layer 208b can be configured to store GPS event data from GPS on-board units 1 in a GPS event database 211. A separated routing database 212 could be provided to store mapping and route data based on, inter alia, GPS data to store routes traveled by vehicles. Another database layer 208a can include a business logic database 204 and a reporting database 210 to store rules for analysis of data and reports analyzed data respectively. A database layer 208b can be operably connected to other databases, for example external databases 204. For example, an external database 204 can provide traffic data which shows congestion along routes to be traveled by a vehicle, which can be used in conjunction with GPS data 211 and business logic 204 to reroute vehicles or create reports as to congested routes. An applications layer 204, such as an application sever 204, can be used to run applications processing, which may include, for example, sending data to and/or receiving data from one or more other data sources such as client workstations 184, 190, as described above. For example the application layer 204 can be used to provide a graphic user interface 151 of a client workstation 184,194 a user-interactive interface.

In one embodiment, a system is configured to received, store, and process GPS data to provide to a graphic user interface of a client a user-interactive interface for tracking and reporting on vehicles and vehicle fleets. For each vehicle, GPS event data is stored for over an operation period. For example, the data can be stored and processed to show event data for at least one vehicle v for an operation period of a workday, a week, a month, a quarter a year, the life of a service contract, or any desirable of time period. The GPS event data can then be analyzed to derive a plurality of operational metrics for each vehicle. Exemplary operational metrics that can be derived from GPS data include engine on/off, vehicle mileage, idling, number of stops, distance traveled, and speed (including high speed and average speed). For example, an on-board GPS device can be configured to be operational to transmit when a vehicle engine is on, thus engine on/off time can be derived. Idling (stopped while engine running) and speeding (distance/time), as well as vehicle mileage can also be derived from tracking via GPS. This data in turn can be used to derive a number of other operational metrics, including vehicle activity over a predetermined time period, vehicle operational reports, employee performance (e.g., working hours, deliveries per day), driver behavior (e.g.: speeding violations, idling over limits); and fleet performance (e.g., metrics based on data above derived for multiple vehicles). A graphic user interface and an interactive display can be configured display a graphic presentation of at least one operational metric for each of a plurality of vehicles.

Figure 3A:
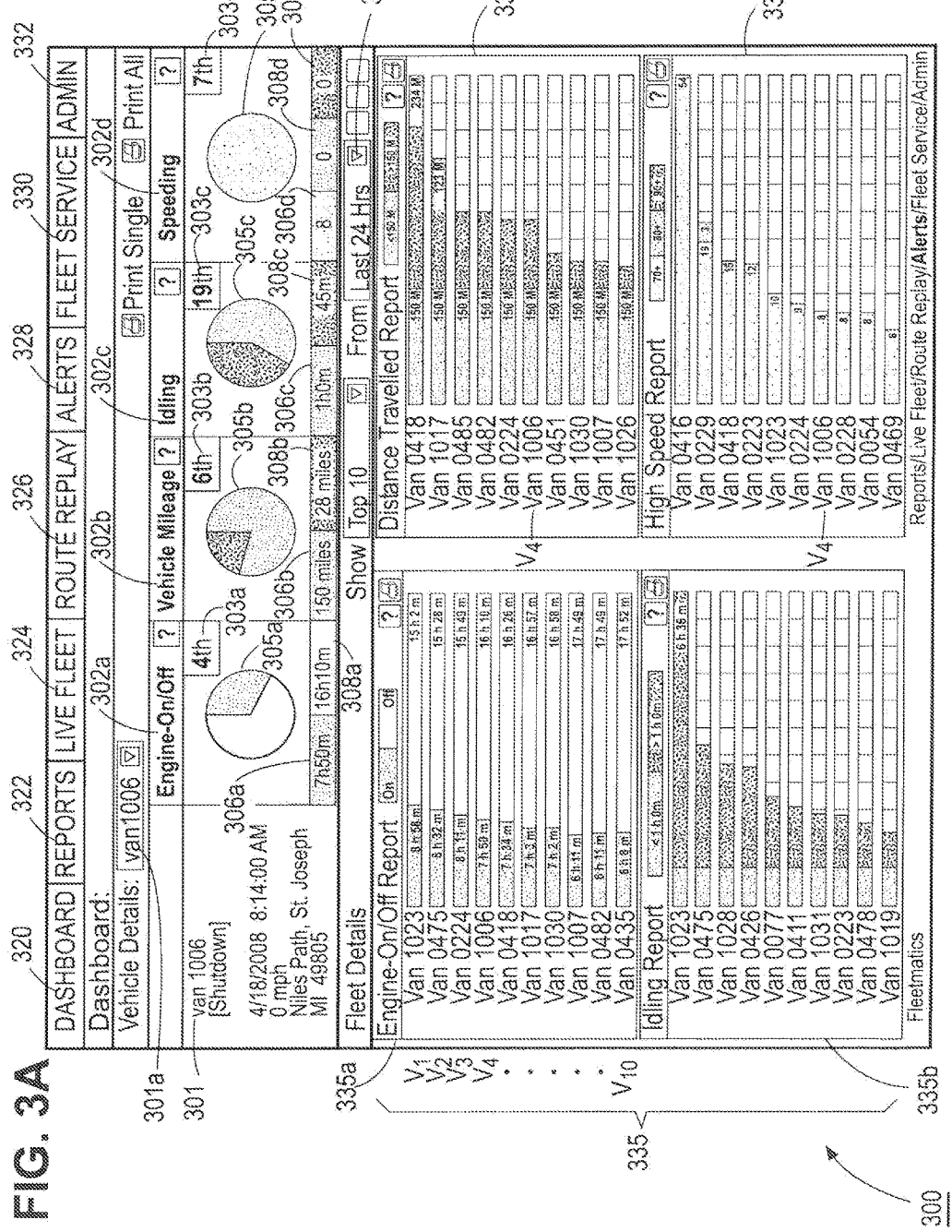
FIGS. 3A-3B depicts an exemplary interactive graphic user interface.
Figure 3B:
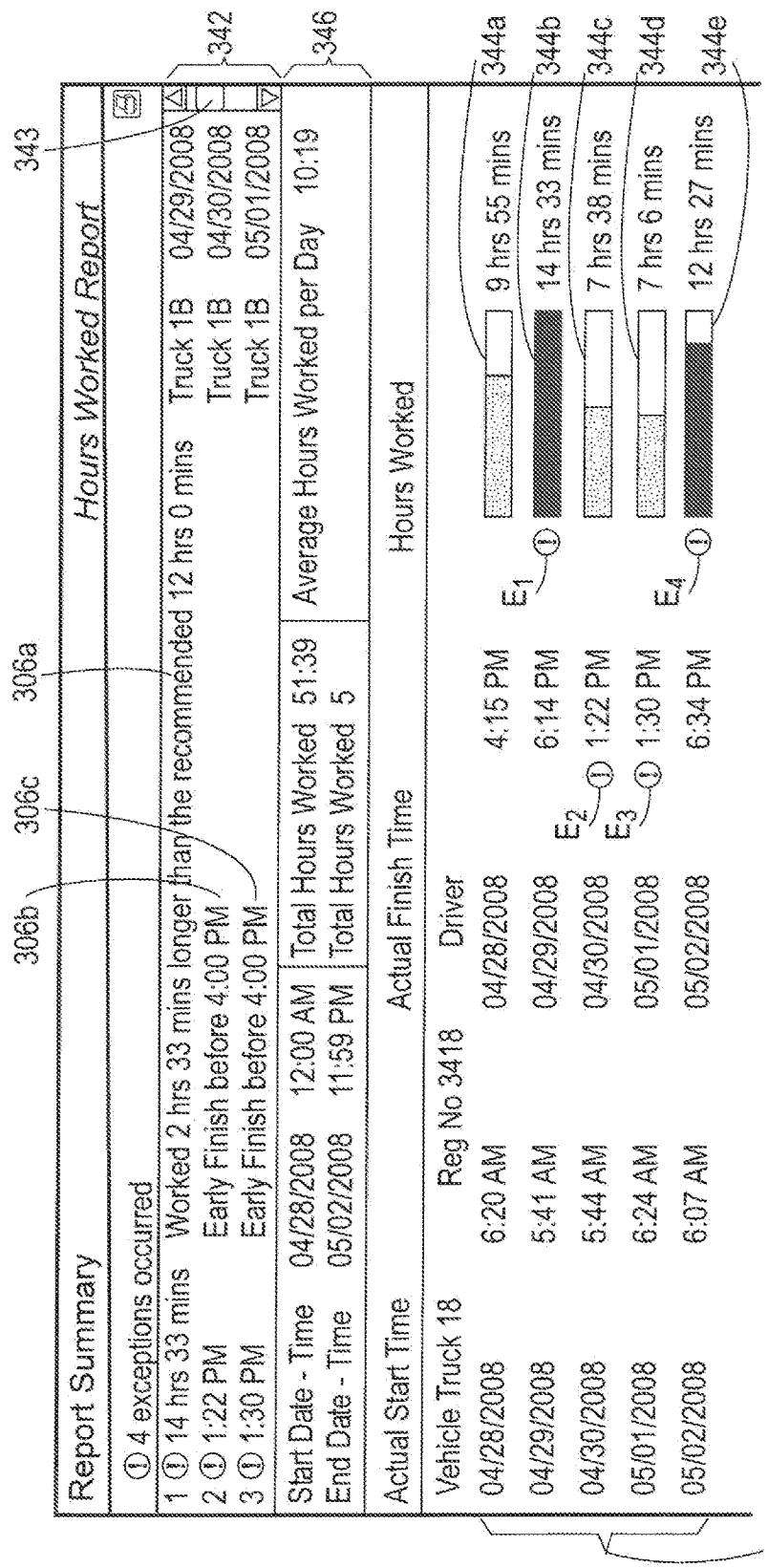

An exemplary interactive graphic user interface 300 on a display device 151 for a user is shown in FIGS. 3A-3B. Such interfaces could be in the form of application software for computer and digital devices as described above, or in the form of webpage accessed by a client from at least one host server, or any combinations thereof as broadly disclosed herein and without limitation. As shown in FIG. 3A, a "Dashboard" 320 page gives a user a first interactive screen to view GPS data and operational metrics. The top of the graphic user interface 300 has, in one embodiment, tabs for "Reports" 320, "Live Fleet," 332 "Route Replay," 324 "Alerts," 328 Fleet Service," 330 and "Admn" 332, which lead to other user interactive displays. For example, a user could select "Live Fleet" 324 using an input such as a keyboard or a mouse, which would lead to a page with GPS data and mapping software which tracks vehicles v1, v2 . . . vn. The page can allow a user such as a dispatcher to, for example, locate and dispatch the closest vehicle to any job site and reroute the nearest vehicle.

The Dashboard 320, as with any other screen, can be configured to offer preset modules or objects for a user to interact with or view, or in the alternative it can be configured to allow a user to customize the information, reports, alerts, etc most important to the user.

As shown in FIG. 3A, the Dashboard 320 screen includes various graphic representations of operational metrics, including reports and alerts, to aid a user in, among other things, vehicle, employee, and fleet management. For example, the operational metrics 302 for individual vehicles include operational metrics such as a engine on/off 302a, vehicle mileage 302b, idling, 302c, and a speeding 302d. Such operational metrics are also shown for various fleet configurations as described below.

The Dashboard 320 shows at the top of the interface 300 a graphic information display for an individual vehicle 301, which can be selected from a drop down menu 301a. Other methods of selection can be used, for example, by selecting with a mouse, a graphic for the vehicle v4 (shown as "Van 1006") in a fleet report graphic 335. The graphic information display for the vehicle 301 includes a reporting and alerts for the vehicle v4, for example, operational metrics such as at least one engine on/off graphic 302a, vehicle mileage graphic 302b, idling graphic 302c, and a speeding graphic 302d.

As shown, the graphics 302a, 302b, 302c, 302d on the individual vehicle 301 is shown reporting graphic that shows a rating 303 under each operational metric comparing the vehicle performance against other vehicles in the fleet for a 24 hour period. For instance, an engine on/off rating graphic 303a puts the vehicle v4 in $4^{th}$ place in the fleet, a vehicle mileage rating graphic 303b puts the vehicle v4 in $6^{th}$ place, idling rating graphic at 303c at $19^{th}$ place, and a speeding rating graphic 303d puts the vehicle v4 at $7^{th}$ place. These markings for v4 are also seen in the fleet management graph 335a, 335b, 335c as described below.

The interface 300 also provides, for the graphic user interface, an alert when an operational metric for a vehicle exceeds a predetermined threshold established for the operational metric. For example, report graphic on the individual vehicle 301 shows the name of the driver, that the vehicle has shutdown (e.g.: for the end of the workday), the time for shutdown, and for each of the operational metrics, a pie chart graphic 305a, 305b, 305c, 305d, and a split-window graphic 306a/308a, 306b/308b, 306c/308c, 306d8/308d8/309d for the individual's engine on/off, vehicle mileage, idling, and speeding graphics respectively, each of which are designed to alert and report to a user when a vehicle has exceeded a predetermined criterion such as a predetermined threshold. Each of the pie chart 330 and split window graphics 306/308 show the time the vehicle spent within threshold 306, as well as a representation that alerts when the vehicle exceeded the threshold. For example, each metric has in the split window graphic 306/308 a predetermined criterion or threshold 306 established for the 24 hour period: 8 hours for engine on/off 306a, 150 miles for vehicle mileage 306b8308b, 1.0 hours for idling 306c/308c, and three speeding thresholds of over 70 mph, 80 mph, and 90 mph under speeding 306d8/308d8/309d.

For example, the "Engine On/Off" split window 306a/308a has in a left-hand window, for vehicle operation within the predetermined threshold 306a, a graphic which includes a color (green) and text describing the vehicle's v4 operation statistic under the threshold, 7 hours, 50 m. The right-hand window 308a, shows a window with the time remaining in the 24 hour period (16 hours, 10 min.) Because this is time where the engine was not running, and thus within the threshold, the window 308a is configured to show neutral color or identifier (e.g. white, tan, clear). The pie chart 305a shows a visual with green and neutral coloring corresponding to the times in the split window 306a,308a which allows a user to readily visualize the percentages for the Engine On/Off time.

The "Vehicle Mileage" split window 306b/308b shows the predetermined threshold of 150 miles in the left-hand window 306b, which is in green as with Engine On/Off. However, the right-hand window 308b shows the driver has exceeded the threshold by another 38 miles. As this is in excess of the threshold, where the window 308b is configured to alert the user with a red color. The pie chart 305b shows a visual with green and red coloring corresponding the times in the split window 306b,308b which allows a user to readily visualize the percentages for the vehicle mileage, as well as alert the user that the vehicle is excess of the threshold.

The Idling and Speeding graphics are similarly configured, thereby proving a user friendly view for all the metrics for the individual vehicle and driver. For example, Idling 302c includes an alerting threshold where of 1 hour, and alerts for excess of an hour of idling. Speeding 302d includes reporting and alerting for, among other things, speeds in excess of 70 mph 306d, 80 mph 308d, and 90 mph 309d, with different colors for each (e.g. green, yellow, and red).

It will be understood that other graphical displays could be used, such as bar graphs, gauge icons, whimsical graphics (e.g., a speedometer or a stopwatch), or any other such graphic as is useful.

For each vehicle v1, v2, v3 . . . vn, historical GPS event data can be stored, as for example, for a plurality of operation periods. Accordingly, while the graphics 302a, 302b, 302c, 302d on the individual vehicle 301 are over an operational 24 hour period, the graphics could be configured to show data for longer periods and/or a plurality of operational periods, such as a week, a month, a quarter, a year, or other periods as desired. Other thresholds could be implemented for each of these periods, as for example, by adding the criteria or thresholds for each operational period, e.g., for Vehicle Mileage 302b, or an 160 hour threshold for a 4 work-week period (a five day week), where each 24 hour period is 8 hours. Other reports can be generated based on the historical event data.

For example, report information can include one or more reports on: vehicle activity over a predetermined time period, speeding, idling, vehicle operational reports, maintenance, employee performance, driver behavior; and fleet performance.

An exemplary, selectable "Top 10" fleet report 335 shows reports 335a, 335b, 335c, 3355d for the top ten vehicles in each of 4 operational metrics for a fleet of vehicles: Engine On/Off 335a, Distance Traveled 335b, Idling Report 335c, and High Speed Report 335d. Operational metrics for one of the vehicles v4, "Van 1006" is shown at the top of the graphic user interface 301, and the vehicle rankings as shown for v4 are shown in three of the metrics 335a, 335b, and 335d where the vehicle is in the top 10, as described above. While the report shows the "Top 10," a selectable drop down menu 308b allows a user to select any number of options for reporting (e.g., top 20, 50) and another drop down menu 310 allows a user to select time periods (e.g. 24 hours, 5 days, a month), to obtain ranked vehicle performance for the fleet and vehicles therein.

The "Engine On/Off Report" 335 ranks the vehicles v1 . . . v10 from highest to lowest for "Engine On" time over the 24 hours. For example, a row for the top vehicle v1 shows the engine was on for 9 hours and 58 minutes and off for 15 hours and 2 minutes. The lowest ranked v10 (Vehicle 0435) shows engine operation for 6 hours and 8 minutes, whereas the off time is 17 hours and 52 minutes. A fillable bar graph shows on and off times, with "on" being green and off being blank or neutral, with the fill line visually showing the percentage of the 24 hour period. Text graphics write out the time. The rows of bar graphs for each vehicle are aligned in a columnar format so as to readily compare each vehicle's statistics with one another.

The "Distance Traveled" 335b reports and alerts is consistent with criteria for the "Vehicle Mileage" 302b for the individual driver described above, and ranks vehicles within the top 10 of the fleet from highest to lowest for distance traveled. A finable bar graph shows the predetermined threshold of 150 miles in the left-hand bar graph, which is in green. However, the left-hand of the bar graph shows, with fill lines by percentage, where the driver has exceeded the 150 miles threshold. The top ranked vehicle of the fleet is in excess of the threshold by 236 miles, whereas the $10^{th}$ ranked vehicle (Van 1026) is only a few miles over. A fillable bar graph shows distances times, with the 150 mile threshold being green any excess mileage being red so as to alert the user, with the fill line visually showing the percentage of the 300 mile distance. Text graphics write out mileage at or under 150 miles on the left-hand side, and mileage in excess right hand side. Again, rows of the bar graphs for each vehicle are aligned columnar format so as to readily compare each vehicle's statistics with one another. The "Idling" 305c and "High Speed" 306d reports graphics are similarly configured, thereby proving a user friendly view for all the metrics for the ranked vehicles and drivers in the fleet. For example, "Idling" 335c includes an alerting threshold of 1 hour, and reports, bar graphs, alerts for excess of an hour of idling. As with the individual report 302 above, speeding 335d includes bar graphs, reporting and alerting for, among other things, speed in excess of 70 mph, 80 mph, and 90 mph, with different colors for each (e.g. green, yellow, and red).

More detailed reports can be created and configured. FIG. 3B shows one example of a detailed report for an employee and vehicle, as could be accessed, for example, in a page for reports (see FIG. 3A 322). The report is an "Hours Worked Report" 350 for a vehicle (Truck 18) over a five day workweek, as shown in the lower table 340 portion of the graphic user interface 340. Each day of the work week is given a row 340a, 340b, 340c, 340d, 340e on the report, and the table 340 which includes columns for day, start time, driver, finish time, and an "Hours Worked" bar graph 344a, 344b, 344c, 344d, 344e which shows a colored fill bar and text showing the hours worked. The report has alerting icons E1, E2, E3, E4, which show exceptions where a vehicle and driver have exceeded predetermined thresholds or criteria. The exception alerts are described in an upper window 342, which can be scrolled using a scrolling graphic 343 using a mouse, via touch screen, or other input. The upper window 342 reports and alerts the user as to the exceptions, which reports two alerts 306b, 306c that on 2 days a driver finished at 1:22 pm and 1:30 p.m., which is before predetermined time (before 4:00 p.m.). Another alert 306a shows that on one day the driver worked two hours longer than a predetermined time period (12 hours), as the driver worked 14 hours and 33 minutes. By scrolling down the upper window module 342, the user can see the fourth alert for the exception E4, where the driver exceeded the predetermined threshold of 12 hours by 27 minutes. The fill bars on the bar graphs 340a, 340b, 340c, 340d in the lower table 340 can also be colored to reflect an alert, such as where on days where a driver has exceeded the predetermined threshold for hours worked E1, E4. For example, the fill bar 344b, 344e can be colored red when the predetermined threshold is exceeded, whereas when under the threshold, the bar 344a, 344c, 344d is colored green. A week summary portion 346 of the graphic user interface 350 can give over all statistics for the week, such as start and finish dates and times, total hours and days, and average hours per day.

Still other reports based on GPS data and tracking could be provided, such as driving behavior including vehicle speed, engine start-up and shut-down and idling time, or any others including as described herein which can be used to enforce driving policy and curb unwanted behavior like excessive speeding, tardiness and extended vehicle idling.

Similarly, alerts based on GPS data and tracking could be generated such as alerting a user immediately if a vehicle is used during off-hours, which can indicate a vehicle theft. Other exemplary alerts include late deliveries, vehicle care or maintenance is needed, or area reporting and/or need for rerouting. It will be noted that in some embodiments, a portable device such as a smart phone or PDA can be configured to receive alerts that need urgent attention, such as an off-hours use alert or an alert indicating rerouting is needed. Alerts can be flagged in relevant reports as shown above, and users can also be notified of any alerts as soon as a violation occurs via email or mobile device. For example, alerts can be triggered for excessive speeding, excessive idling, engine start-up or shut-down during off-hours unauthorized vehicle usage and when a vehicle enters or exits specific geographic areas. Alerts can also be configured to alert when vehicles are due for scheduled maintenance (e.g., based on a specific length of time, miles driven, or engine-on time). Alerts can also be segregated from reporting on a separate page of a graphic user interface (e.g. accessible by a tab 328 as shown on the Dashboard 328 at FIG. 3A).

Figure 4:
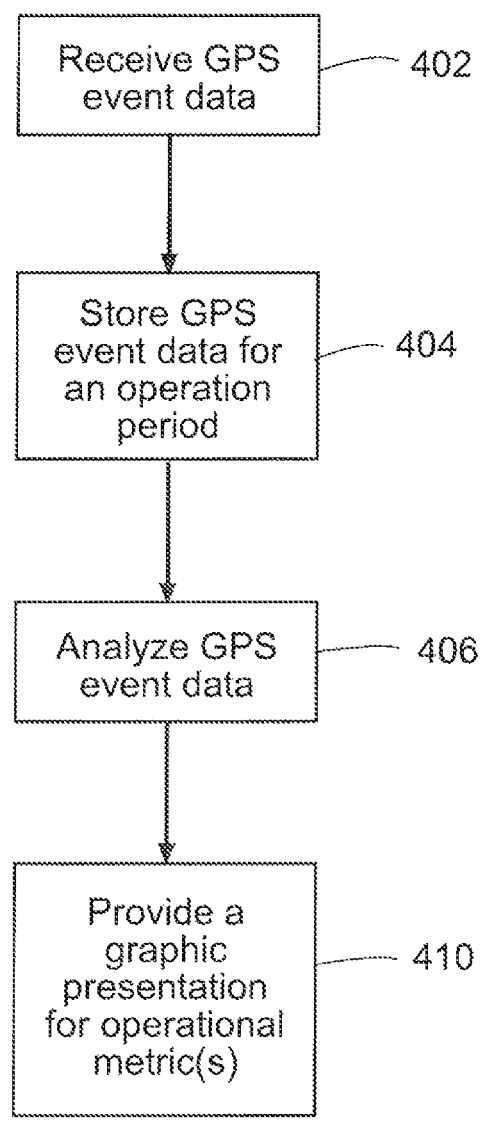
FIGS. 4 and 5 are flowcharts depicting exemplary processes.

FIG. 4 shows a flow chart for a method of presenting GPS event data for a graphic user interface, including in accord with embodiments as described herein. As shown in block 402, the system receives GPS event data transmitted from a plurality of GPS devices, each GPS device associated a vehicle. At block 404, the system stores, for each vehicle, in a memory operatively coupled to at least one of the processors the GPS event data over an operation period. At block 406, the GPS event data is analyzed to derive a plurality of operational metrics for each vehicle. At block 410, the system provides, for a graphic user interface, an interactive display configured display a graphic presentation of at least one operational metric for each of a plurality of vehicle.

The system can also be configured to provide mapping and tracking functions, as described above. The system can be configured to interface with mapping systems, for example, such as Google Maps (http://maps.google.com/maps), www.mapquest.com, www.mapsonus.com, www.maps.expedia.com, www.maps.yahoo.com (accessed through www.yahoo.com), www.maps.com, www.maps.excite.com, (accessed through www.excite.com), and www.mapblast.com. Also see U.S. Pat. Nos. 4,974,170, 5,682,525 and 6,148,260, the entirety of each of which is incorporated by reference herein. The system can also be integrated with systems to able to get real-time traffic information via the mapping in order to help drivers avoid traffic congestion.

In another embodiment, the system can be configured to store a record of a route from an origin location to a destination location and record the route for provision to a computer configured to display the route as a map. A mapping integration including functionality to replay traveled routes such as a "Route Replay" function (see FIG. 3A, 326) is described in U.S. patent application Ser. No. 12/391,516, entitled "System and Method for Providing an Electronic Representation of a Route," the entirety of which is incorporated by reference hereby.

Figure 5:
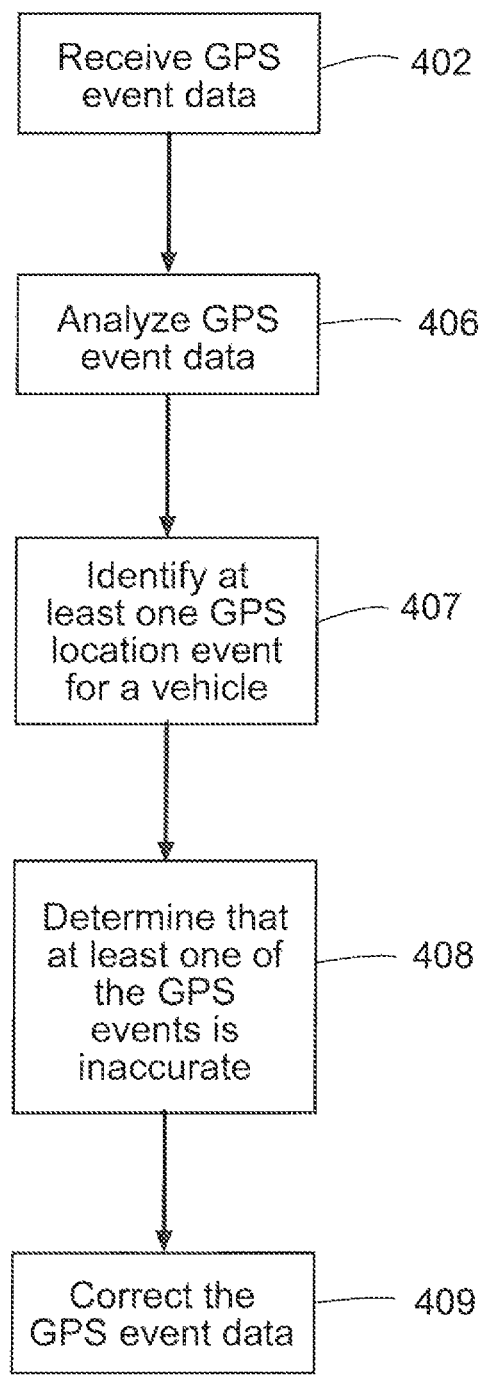

In one embodiment, as shown in FIG. 5, the system is configured to correct GPS event data to provide accurate tracking data for a vehicle. The system corrects, using at least one correction algorithm, GPS event data from a vehicle. At least one correction algorithm, when executed comprises identifying at least one GPS location event for a vehicle 407, and then as shown at step 408 determines if the event is accurate for the vehicle. In one example, up to date mapping may place the vehicle in a impossible or inaccessible location, such as on the top of a building or in the middle of a body of water with no nearby bridge or road. In such a case, the event is determined to be inaccurate, and the event data is corrected, for example, by excluding it from the tracking and reporting data, or by recalculating a trajectory from a prior position. In another example, a plurality GPS location events for a vehicle can be identified, where, upon comparing at least one of the plurality GPS location events with a different one of the plurality GPS location events, it can be determined that at least one of the location events is inaccurate for the vehicle. For example, a GPS signal may indicate to the system that a vehicle distance from a prior position is too far (e.g., a 5 mile radius) from its prior position as reported 60 seconds prior and when accounting for the maximum possible speed for the vehicle, or some other criterion. Or, in another example, a series of GPS signals may shown for events that the next signal, if in the next 60 seconds, must be in a range (e.g., a 0-3.5 mile radius from the prior point), and if the signal is not in that range, the GPS event is false. In such a case, the event data is corrected, for example, by excluding it from the tracking and reporting data, or using some other correction recalculation.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention. Therefore, the scope of the appended claims should not be limited to the description and illustrations of the embodiments contained herein.

I claim:

1. A computer system for managing a vehicle fleet based on historical GPS event data, the system comprising:
one or more processors programmed at least to:
receive GPS event data transmitted from a plurality of GPS devices, each GPS device being associated with a vehicle of the vehicle fleet that has a plurality of vehicles;
for each vehicle, store, in a memory operatively coupled to at least one of the processors, the GPS event data;
analyze the GPS event data to derive a plurality of operational metrics for each vehicle; and
provide, for a graphic user interface, an interactive display configured display a graphic presentation of an operational metric for each of a plurality of vehicles,
wherein the one or more processors are further programmed to determine an incorrect position of a vehicle as reported in the GPS event data, exclude the incorrect position from the GPS event data, and recalculate a trajectory based on a position prior to the incorrect position.

2. The computer system of claim 1, wherein the one or more processors are further programmed to:
provide, for the graphic user interface, the graphic presentation of the operational metric, the operational metric including an operation metric selected from the group consisting essentially of: engine on/off, vehicle mileage, idling, number of stops, and speed.

3. The computer system of claim 1, wherein the one or more processors are further programmed to:
provide, for the graphic user interface, an alert when an operational metric for a vehicle meets or exceeds at least one predetermined criterion established for the operational metric.

4. The computer system of claim 3, wherein
the operational metric includes at least one of: engine on/off, vehicle mileage, idling, and speeding.

5. The computer system of claim 1, wherein the one or more processors are further programmed to:
correct, using a correction algorithm, the GPS event data.

6. The computer system of claim 1, wherein
the one or more processors are further programmed to:
store, in a memory operatively coupled to at least one of the processors, a record of a route from an origin location to a destination location; and
record the route for provision to a computer configured to display the route as a map.

7. The computer system of claim 1, wherein the one or more processors are further programmed to:
for each vehicle, store, in the memory operatively coupled to at least one of the processors, historical GPS event data for a plurality of operation periods.

8. The computer system of claim 1, wherein the one or more processors are further programmed to:
generate a report based on said historical event data.

9. The computer system of claim 8, wherein
the report includes:
vehicle activity over a predetermined time period;
a speed report;
an idling report;
vehicle operational reports;
employee performance;
driver behavior; and
fleet performance.

10. A method for managing a vehicle fleet based on historical GPS event data, the method comprising:
receiving GPS event data transmitted from a plurality of GPS devices, each GPS device being associated with a vehicle of the vehicle fleet that has a plurality of vehicles;
storing, for each vehicle, in a memory operatively coupled to at least one of the processors, the GPS event data; and
analyzing the GPS event data to derive a plurality of operational metrics for each vehicle; and
providing, for a graphic user interface, an interactive display configured display a graphic presentation of an operational metric for each of a plurality of vehicles,
wherein the method further comprises determining an incorrect position of a vehicle as reported in the GPS event data, excluding the incorrect position from the GPS event data, and recalculating a trajectory based on a position prior to the incorrect position.

11. The method of claim 10, wherein the method further comprises:
providing, for the graphic user interface, the graphic presentation of the operational metric, the operational metric including at least one of: engine on/off, vehicle mileage, idling, number of stops, and speed.

12. The method of claim 10, wherein the method further comprises:
providing, for the graphic user interface, an alert when an operational metric for a vehicle exceeds a predetermined criterion established for the operational metric.

13. The method of claim 12, wherein
the operational metric includes an operational metric selected from the group consisting essentially of: engine on/off, vehicle mileage, idling, and speeding.

14. The method of claim 10, wherein the method further comprises:
correcting, using a correction algorithm, the GPS event data.

15. The method of claim 10, wherein the method further comprises:
storing, in a memory operatively coupled to at least one of the processors, a record of a route from an origin location to a destination location; and
recording the route for provision to a computer configured to display the route as a map.

16. The method of claim 10, wherein the method further comprises:
for each vehicle, storing, in the memory operatively coupled to at least one of the processors, historical GPS event data for a plurality of operation periods.

17. The method of claim 10, wherein the method further comprises:
generating a report based on said historical event data.

18. The method of claim 17, wherein
the report includes:
vehicle activity over a predetermined time period;
a speeding report;
an idling report;
vehicle operational reports;
employee performance;
driver behavior; and
fleet performance.

19. A computer program product comprising a computer-readable storage medium encoded with instructions that, when executed by at least one processor within a computer system that comprises one or more processors and a memory operatively coupled to at least one of the processors, cause the computer system to execute a method for managing a vehicle fleet based on historical GPS event data, the method comprising:
- receiving GPS event data transmitted from a plurality of GPS devices, each GPS device being associated with a vehicle of a vehicle fleet that has a plurality of vehicles;
- for each vehicle, storing in a memory operatively coupled to at least one of the processors, the GPS event data;
- analyzing the GPS event data to derive a plurality of operational metrics for each vehicle; and
- providing, for a graphic user interface, an interactive display configured display a graphic presentation of an operational metric for each of a plurality of vehicles,
- wherein the method further comprising determining an incorrect position of a vehicle as reported in the GPS event data, excluding the incorrect position from the GPS event data, and recalculating a trajectory based on a position prior to the incorrect position.

* * * * *